United States Patent [19]

Watanabe

[11] Patent Number: 5,031,471

[45] Date of Patent: Jul. 16, 1991

[54] SEQUENCE CONTROL MECHANISM EMPLOYING GEAR MECHANISM

[76] Inventor: Takashi Watanabe, c/o Tanashin Denki Co., Ltd., 2-19-3, Shinmachi, Setagaya-Ku, Tokyo, Japan

[21] Appl. No.: 486,108

[22] Filed: Feb. 28, 1990

[30] Foreign Application Priority Data

Oct. 3, 1989 [JP] Japan .................................. 1-58958

[51] Int. Cl.$^5$ ............................................. F16H 3/34
[52] U.S. Cl. ........................................ 74/354; 74/384; 360/137
[58] Field of Search ..................... 74/354, 380, 384; 360/96.3, 96.4, 137

[56] References Cited

U.S. PATENT DOCUMENTS

| 4,525,760 | 6/1985 | Nemoto et al. | 360/137 |
| 4,621,535 | 11/1986 | Bronson et al. | 74/384 X |
| 4,626,937 | 12/1986 | Hutterer et al. | 360/137 X |
| 4,788,610 | 11/1988 | Arata | 360/137 X |
| 4,819,891 | 4/1989 | Kamijo | 360/96.4 X |
| 4,843,499 | 6/1989 | Ogawa | 360/96.3 |
| 4,858,051 | 8/1989 | Fischer et al. | 360/137 |
| 4,862,766 | 9/1989 | Molders | 74/384 |

FOREIGN PATENT DOCUMENTS

| 56-145545 | 11/1981 | Japan . | |
| 32253 | 2/1983 | Japan | 360/137 |
| 82356 | 4/1986 | Japan | 360/137 |

Primary Examiner—Dwight Diehl

[57] ABSTRACT

A sequence control mechanism having a drive gear driven by a motor, a pivot arm mounted on a same shaft as that of the drive gear, a transmitting gear which is supported by a shaft mounted on the pivot arm and is cooperated with the drive gear, partly-toothless gears which are provided with toothed portions capable of stopping the idling operation of the transmitting gear and engaging with the transmitting gear and toothless portions permitting the idling operation, a first actuating mechanism which cooperates to engage with the partly-toothless gears as well as giving the partly-toothless gears the return force for positioning the toothed portions thereof on the idling track of the transmitting gear, and a second actuating mechanism which, when the transmitting gear passes the toothless portions of the partly-toothless gears, engages with the transmitting gear so that it is driven by the drive gear.

This mechanism makes it possible to perform the sequence control of a plurality of actuating portions by simple construction which controls the driving and, stopping of the motor in time and the switching of the rotating direction without a clutch mechanism or an electromagnet.

3 Claims, 17 Drawing Sheets

SEQUENCE CONTROL MECHANISM EMPLOYING GEAR MECHANISM

BACKGROUND OF THE INVENTION

1. Field of the Invention

The present invention relates to a sequence control mechanism employing gear mechanism which is suitable for use in, for example, an operation mode switching device in a tape recorder and the like.

2. Description of the Prior Art

Conventionally sequence control mechanisms are mechanism have been well known which is provided with first and second actuating portions, in which the rotating force of the drive rotator, such as a gear, driven by a motor is transmitted to the first actuating portion so that the first actuating portion can perform the predetermined operations, and, when said operations have been finished, said rotating force of the drive rotator is transmitted to the second actuating portion so that the second actuation portion can perform the predetermined operations. Such a sequence control mechanism, generally, is provided with clutch mechanisms on the rotation transmitting paths of the first and second actuating portions, whereby the clutch mechanism on the first actuating portion side is connected and the clutch mechanism on the second actuating portion side is disconnected so that said clutch mechanism on the first actuating portion side is operated. When the predetermined operation of said first actuating portion has been finished, the clutch mechanism on the first actuating portion side is disconnected and at this time the clutch mechanism on the second actuating portion side is connected so that the second actuating portion may perform the predetermined operation.

In such a conventional sequence control mechanism, there have been problems in which, since it requres the clutch mechanism on the rotation transmitting path of each actuating portion as well as a control mechanism for controlling the timing when each of these clutch mechanisms is connected and disconnected, the construction thereof becomes complicated as does the rotation transmitting path with respect to each of the actuating portions.

SUMMARY OF THE INVENTION

In view of the foregoing, it is an object of the present invention to provide a sequence control mechanism employing a gear mechanism which can perform the sequence control of a plurality of actuating portions by simple construction which controls timing, driving and stopping the motor and the switching of the rotating direction without the clutch mechanisms or the electromagnet.

To achieve the above object, a sequence control mechanism employing gear mechanism of an embodiment of the present invention comprises a drive gear driven by a motor, a pivot arm mounted on a same shaft as that of said drive gear, a transmitting gear which is supported by a shaft mounted on said pivot arm and is cooperated with said drive gear, partly-toothless gears which are provided with toothed portions stopping on tooth bottoms thereof, the idling operation of said transmitting gear and engaging with said transmitting gear and toothless portions permitting the idling operation, a first actuating mechanism which cooperates to engage with said partly-toothless gears as well as which gives to said partly-toothless gears the return force for positioning said toothed portions thereof on the idling track of said transmitting gear, and a second actuating mechanism which, when said transmitting gear passed by said toothless portions of said partly-toothless gears, engages with said transmitting gear so that it is driven by said drive gear.

Also, it is preferable to mount a cam on any one of said partly-toothless gear and said first actuating mechanism and a cam follower pin on the other.

Furthermore, it is preferable to make said motor rotatable forwardly and reversely.

If the drive gear is driven to rotate in the one direction by the motor, the pivot arm pivots on the one direction so that the idling operation is blocked and the partly-toothless gear rotates in the one direction. By the rotation in the one direction of said partly-toothless gear, the first actuating mechanism is operated. And, as the predetermined operation of this first actuating mechanism has been completed, said toothless portion of the partly-toothless gear faces is performed. After the transmitting gear passes through said toothless portion, the pivot arm pivots in one direction so that the transmitting gear is engaged with the second actuating mechanism, thereby allowing the second actuating mechanism to perform the predetermined operation.

BRIEF DESCRIPTION OF THE DRAWINGS

These and other objects, features and advantages of the invention will become more apparent from the following description of a preferred embodiment of the present invention with reference to the accompanying drawings in which.

DESCRIPTION OF THE PREFERRED EMBODIMENT

An embodiment of the present invention will now be described in detail with reference to the drawings.

Figure 1:
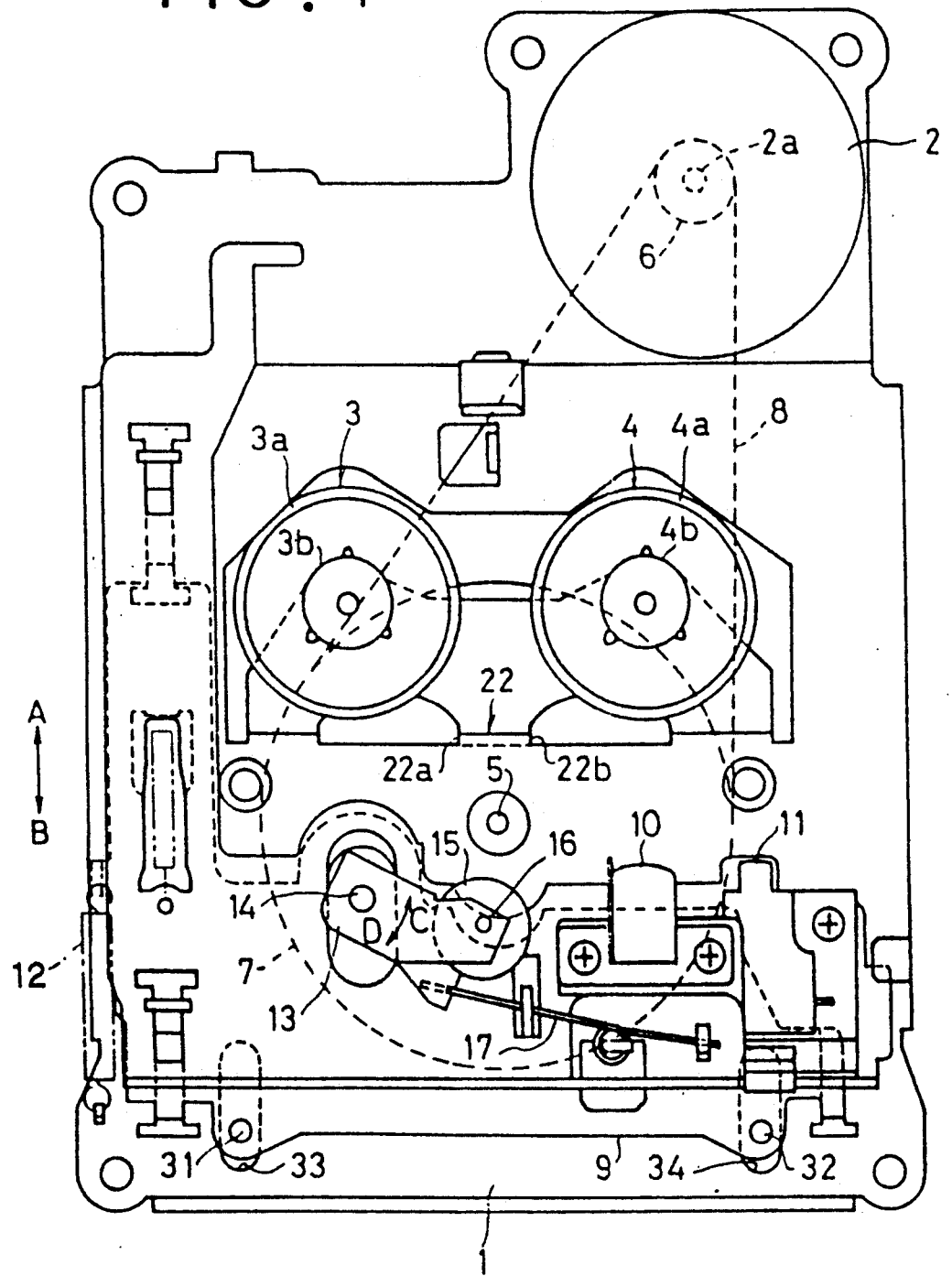
FIG. 1 is a plan view illustrating schematically a tape recorder which is provided with a sequence control mechanism employing the gear mechanism according to an embodiment of the present invention.
Figure 2:
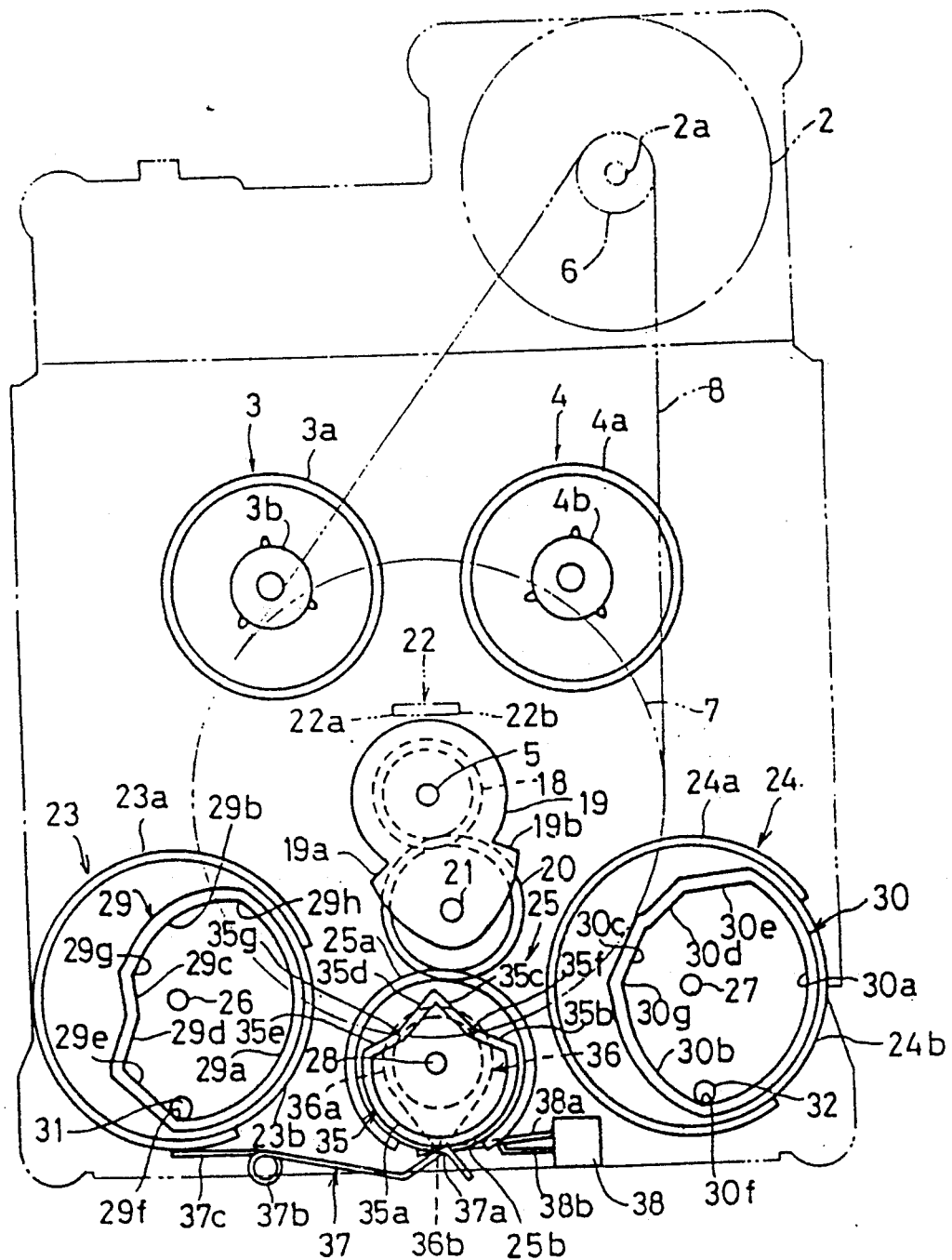
FIG. 2 is a schematic plan view showing a part of said sequence control mechanism in FIG. 1.
Figure 3:
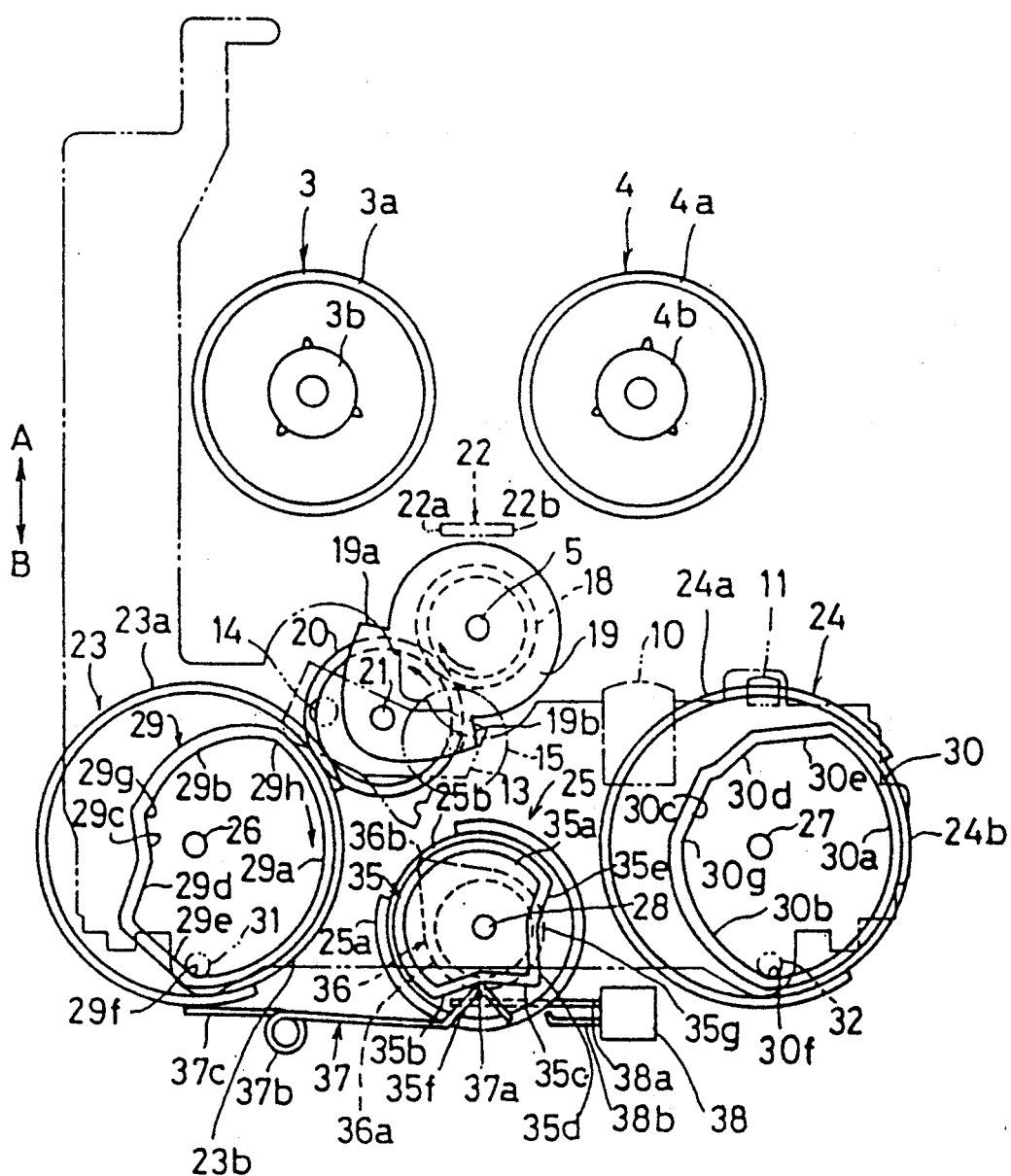
FIGS. 3 through 15 are views of assistance in explaining the operation of said sequence control mechanism of the invention.

FIG. 1 is a schematic plan view of a tape recorder which is provided with a sequence control mechanism using the gear mechanism of the present invention, and FIG. 2 is a schematic plan view showing a part of said sequence control mechanism in FIG. 1. In these two drawings, Reference numeral 1 indicates a base plate, which is provided with a motor 2 rotatable forwardly and reversely, a take-up reel 3, a supply reel 4, and a capstan 5 respectively on the predetermined positions thereof. A rotation shaft 2a of said motor 2 is protruded on the lower side of a base plate 1 and a motor pulley 6 is fixed to the protruded end thereof. A lower end side of a capstan 5 is protruded on the lower side of said base plate 1, and on the protruded end thereof a flywheel 7 is fixed. A endless belt 8 is wound outwardly between said flywheel 7 and said motor pulley 6. The take-up reel 3 on the left of the drawing is constituted in such a way that on a reel gear 3a a reel rest 3b is mounted to rotate coaxially and integratedly with said reel gear 3a. And, the supply reel 14 also is constituted in such a way that on a reel gear 4a a reel rest 4b is mounted to rotate coaxially and integratedly with said reel gear 3a. On the upper side of the base plate 1, a head attaching plate 9 is mounted movably in the direction of arrows A and B. And, to the upper side of said head attaching plate 9, a magnetic recording and reproducing head 10 and a magnetic erasing head 11 are attached respectively. Said head attaching plate 9 is energized in the direction of arrow B [stop position direction] by a head return spring 12. On the upper side of the base plate 1, one end of a pinch roller arm 13 is mounted rotatably in the direction of arrows C and D by a shaft 14. On the other end of said pinch roller arm 13, a pinch roller 15 is mounted rotatably by a shaft 16. The other end of the pinch roller arm 13 is connected through a rod-like pinch roller spring 17 to the head attaching plate 9. And, as said head attaching plate 9 is moved in the direction of arrow A or B, the pinch roller arm 13 is rotated in the direction of arrows C or D through said pinch roller spring 17. And, the pinch roller 15 is connected and disconnected through a tape in a tape cassette (not shown) to the capstan 5. On the flywheel 7 a drive gear 18 is mounted to rotate coaxily and integratedly with said flywheel 7. Between this drive gear 18 and the base plate 1, one end of a pivot arm 19 is mounted rotatably on the capstan 5 coaxial with said drive gear 18. And on the other end of said pivot arm 19 a transmitting gear 20, which is engaged with the drive gear 18, is mounted to rotate by a shaft 21.

In FIG. 2, when the pivot arm 19 reaches the clockwise rotation limit position, the transmitting gear 20 is engaged with the reel gear 3a of the take-up reel 3 to rotate the take-up reel 3. Also, when the pivot arm 19 reaches the counterclockwise rotation limit position, the transmitting gear 20 is engaged with the reel gear 4a of the supply reel 4 to rotate the supply reel 4. Accordingly, the take-up reel 3 and the supply reel 4 constitute a second actuating mechanism which, when said transmitting gear 20 passes by the toothless portions 23b and 24b of first and second partly-toothless gears 23 and 24, is engaged with said transmitting gear 20 so that it is driven by the drive gear 18. The stopping of pivot arm 19's clockwise rotation at the limit position is performed as one halfway end 19a of said pivot arm 19 is contacted with a one end 22a of a stopper member 22 of the base plate 1. And also, the stopping in the counterclockwise rotation limit position of the pivot arm 19 is performed as the other halfway end 19b of said pivot arm 19 is contacted with the other end 22b of the stopper member 22 of the base plate 1. On the lower side of the base plate 1 first, second and third partly-toothless gears 23, 24 and 25 are mounted to rotate about shafts 26, 27 and 28 respectively. Third partly-toothless gear 25 is disposed between the first partly-toothless gear 23 and the second partly-toothless gear 24. The first, second and third 23, 24 and 25 have toothed portions 23a, 24a and 25a and toothless portions 23b, 24b and 25b on outer peripheral sides, respectively. Said toothed portions 23a, 24a and 25a stop on tooth bottoms thereof the idling or racing operation of said transmitting gear 20 as well as engage with said transmitting gear 20. And also, the toothless portions 23b, 24b and 25b permit the idling operation of the transmitting gear 20. On the first and second partly-toothless gears 23 and 24, cams 29 and 30 are mounted, respectively. The cam 29 of the first partly-toothless gear 23 comprises a first arched portion 29a being at a constant distance from a rotating center shaft 26, a second arched portion 29b of which an one end is continuously extended from the one end of said first arched portion 29a and to which the distances from the rotating center shaft 26 become gradually shorter at one end thereof toward the other end thereof, a first inclined portion 29c of which one end is continuously extended from the other end of said second arched portion 29b and of which the other end side is inclined toward the rotating center shaft, a second inclined portion 29d of which one end is continuously extended from the other end of said first inclined portion 29c and of which the other end side is inclined inversely toward the rotating center shaft, and a third inclined portion 29e which is connected between said other end of said second inclined portion 29d and the other end of said first arched portion 29a. And also, the cam 30 of the second partly-toothless gear 24 comprises a first arched portion 30a being at a constant distance from a rotating center shaft 27, a second arched portion 30b of which an one end is continuously extended from the one end of said first arched portion 30a and to which the distances from the rotating center shaft 27 become gradually one end thereof toward the other end thereof, a first inclined portion 30b of which one end is continuously extended from the other end of said second arched portion 30b and of which the other end side is inclined toward the rotating center shaft, a second inclined portion 30d of which one end is continuously extended from the other end of said first inclined portion 30c and of which the other end side is inclined toward the rotating center shaft, and a third inclined portion 30e which is connected between said other end of said second inclined portion 30d and the other end of said first arched portion 30a.

In the cams 29 and 30 of the first and second partly-toothless gears 23 and 24, cam follower pins 31 and 32 protrudedly mounted on the lower surface 9 are respectively locked through the elongated holes 33 and 34 which are punchedly disposed. By operation of the cams 29 and 30 depending on rotation of the first and second partly-toothless gears 23 and 24, the head attaching plate 9 is moved in the direction of arrow A or B through the cam follower pins 31 and 32. The force of which the head attaching plate 9 is energized in the direction of arrow B by the head return spring 12, is transmitted through the cam follower pins 31 and 32 to the first and second partly-toothless gears 23 and 24. Accordingly, the head attaching plate 9 and the head return spring 12 constitute a first actuating mechanism which gives to the first and second partly-toothless gears 23 and 24 the return force for positioning the toothed portions 23a and 24a thereof on the idling track of the transmitting gear 20. On the upper side of the third partly-toothless gear 25 is mounted a first cam 35 and on the lower side there is mounted a second cam 36, respectively. The first cam 35 comprises an arched portion 35a being at a constant distance from a rotating center shaft 28, a first inclined portion 35b of which an one end is continuously extended from the one end of said arched portion 35a as well as of which the other end is inclined toward the rotating center shaft, a second inclined portion 35c of which an one end is connected continuously with the other end of said second inclined portion 35b and of which the other end side is inclined inversely toward the rotating center shaft, a third inclined portion 35d of which an one end is connected continuously with the said second inclined portion 35c and of which the other end side is inclined toward the rotating center shaft in such a manner that it has the relationship of line symmetry to the second inclined portion 35c, and a fourth inclined portion 35e which is connected between the other end of the third inclined portion 35d and the other end of the arched portion 35a and which has the relationship of line symmetry to the first inclined portion 35b. Also, on said first cam 35, a V-shaped and curved portion 37a, which is one end of a brake spring 37 such as a rod spring, is slidably contacted therewith. Said brake spring 37 is disposed in such a manner that a ring-shaped portion 37b and the other end 37c are locked in a spring locking member (not shown) of the base plate 1. And, by the brake spring 37, the rotating position of the third partly-toothless gear 25 is restricted. The second cam 36 of the third partly-toothless gear 25 has a arched portion which is concentric with the rotating center shaft 28 thereof, and a substantially triangular expansion portion 36b protruded at the one portion of the outer periphery thereof. And, the expansion portion 36b of the second cam 36 push a movable contact segment 38a of a motor stop switch 38 using as a switch thereof depending on the rotation of the third partly-toothless 25 to contact the movable contact segment 38a with a fixed contact segment 38b, thereby turning the motor stop switch 38 to ON. This motor stop switch 38 is attached to the lower surface of the base plate 1. And, there is constituted an electrical circuit in such a way that, only when the motor stop switch 38 is turned on and at this time a stop operation switch (not shown) is operated, the motor 2 is stopped. Accordingly, when the stop operation switch is not operated, even though the motor stop switch 38 is turned on, the motor 2 is not stopped.

The operation of a the tape recorder having the sequence control mechanism employing the gear mechanism of the subject invention is explained with reference to FIGS. 1 through 17 as follows.

First, an explanation with reference to the reproduction or play mode thereof will be made.

Figure 4:
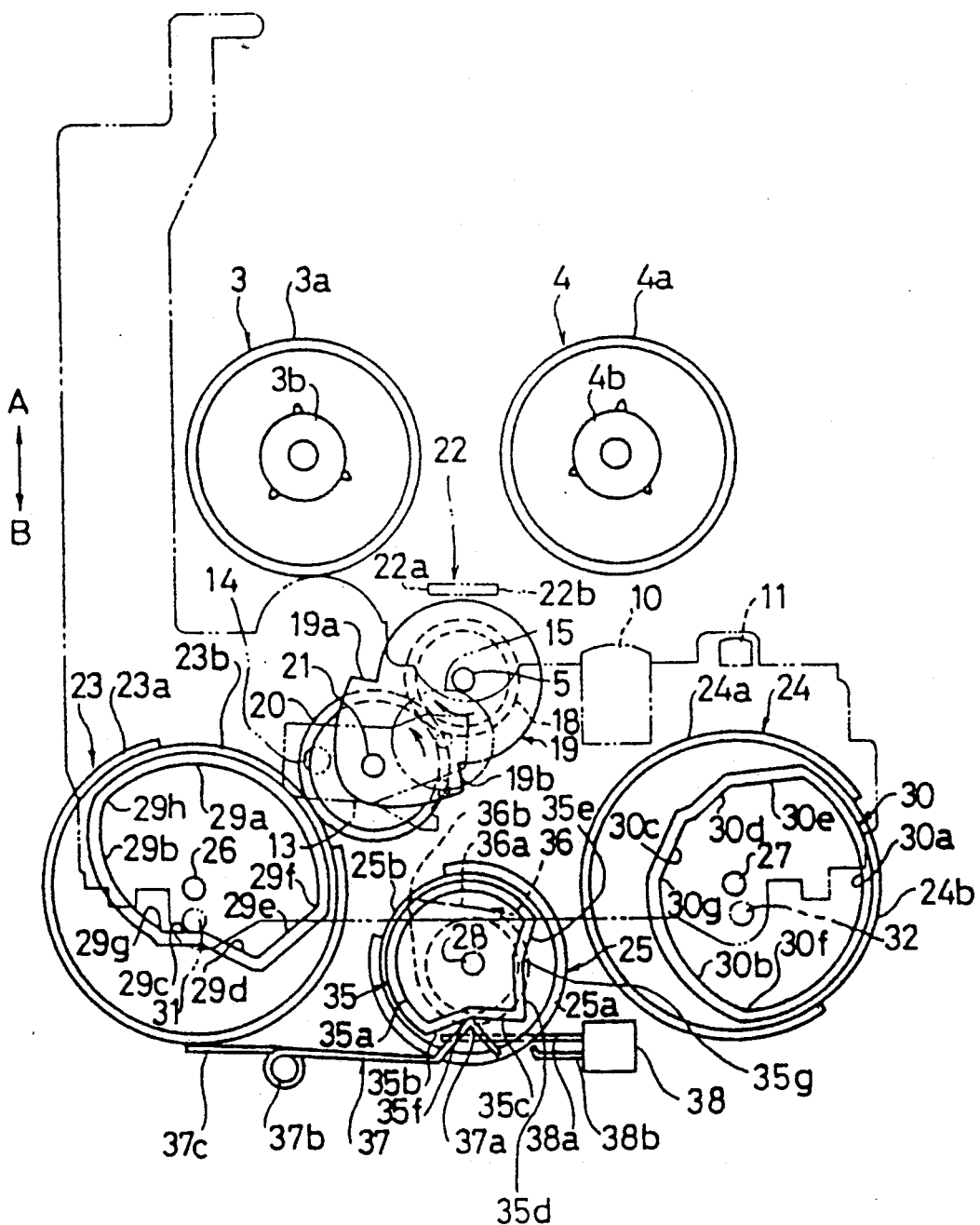
Figure 16:
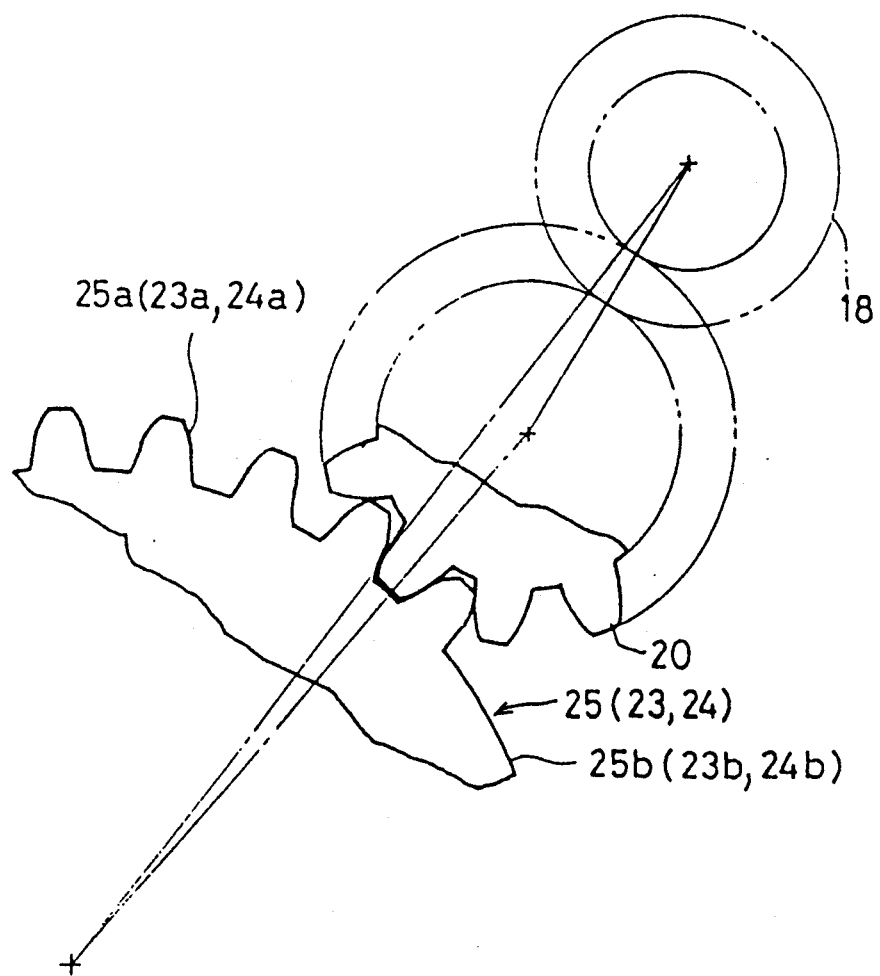
FIG. 16 is a view for explaining the rock-stopping operation of the rocking arm of said sequence control mechanism.

If, when the tape recorder is in the stop state shown in FIGS. 1 and 2, a switch for reproducing operation (not shown) is operated, then the motor 2 is rotated at a constant speed clockwise (forward in the drawings) on the basis of the operating signal from said switch. By the rotation of this motor 2, the flywheel 7, the drive gear 18 and the capstan 5 are rotated clockwise integratedly with each other through the motor pulley 6 and the endless belt 8, as well as the transmitting gear 20 is rotated counterclockwise, and also the pivot arm 19 is intended to pivot clockwise about the capstan 5. However, at this time, since the center of the transmitting gear 20 is deviated backward in the pivot direction [right in the drawings] from the line connecting between the center of drive gear 18 and the center of the third partly-toothless gear 25, the tooth top of the transmitting gear 20 is fitted with the tooth bottom of the toothed portion 25a of the third partly-toothless gear 25 as shown in FIG. 16, thereby stopping the pivoting clockwise of the pivot arm 19. In this state, the third partly-toothless gear 25 is rotated clockwise at a predetermined angle through the transmitting gear 20 driven by the drive gear 18. By this rotation of the third partly-toothless gear 25, since the expansion portion 36b of the second cam 36 is separated from the movable contact segment 38a of the motor stop switch 38, the movable contact segment 38a is separated from the fixed contact segment 38a, so that the motor stop switch 38 is turned off. If by the rotation of the third partly-toothless gear 25 the toothless portion 25b thereof is reached at the transmitting gear 20, this transmitting gear 20 is separated from the third partly-toothless gear 25, whereby the pivot arm 19 is rotated clockwise. At this time, the third partly-toothless gear 25 reaches a rotating termination position and the third partly-toothless gear 25 is reversely-rotated slightly counterclockwise by slidably contacting the curved portion 37a of the brake spring 37 with the second inclined portion 35c of the first cam 35 so that said curved portion 37a is stably stopped in the state engaged with a first curved recess 35f between the first inclined portion 35b and the second inclined portion 35c. And thus, when the pivot 19 has been reversely rotated counterclockwise, the third partly-toothless gear 25 can be smoothly and ensurely engaged with the toothed portion 25a of the third partly-toothless gear 25. The transmitting gear 20 departed from the third partly-toothless gear 25 is engaged with the toothed portion 23a of the first partly-toothless gear 23 as well as the pivot arm 19 is intended to pivotably rotate clockwise. Simultaneously, the center of the transmitting gear 20 is deviated backward in the pivoting direction [right in the drawing] from the line connecting between the center of the drive gear 18 and the center of first partly-toothless gear 23 and the tooth top of the transmitting gear 20 is fitted with the tooth bottom of the toothed portion 23a of the first partly-toothless gear 23, thereby stopping the pivoting clockwise of the pivot arm 19 [in the state of FIG. 3]. In this state the first partly-toothless gear 23 is rotated clockwise at a predetermined angle through the transmitting gear 20 driven by the drive gear 18. With this rotation of the first partly-toothless gear 23, one cam follower pin 31, which has been locked by this time in the first curved recess 29f between the first arched portion 29a and the third inclined portion 29e of the cam 29, is slidably contacted with first and second arched portions 29a and 29b and first inclined portion 29c sequently, so that the head attaching plate 9 is moved in the direction of arrow A against the energized force of the head return spring 12 through the cam follower pin 31. At the termination of said movement, the toothless portion 23a of the first partly-toothless gear 23 reaches the transmitting gear 20 and therewith one cam follower pin 31 is slidably contacted with the first inclined portion 29c of the cam 29 which is integrated with the first partly-toothless gear 23 [in the state of FIG. 4]. Since one cam follower pin 31, which is energized in the direction of arrow B through the head attaching plate 9 by the head return spring 12 at the termination of movement in the arrow A direction of the head attaching plate 9 in FIG. 4, is slidably contacted with the first inclined portion 29c of the cam 29 integrated with the first partly-toothless gear 23, said first partly-toothless gear 23 is slightly rotated counterclockwise, so that the cam follower pin 31 is stably stopped in the state engaged with a second curved recess 29g between the second arched portion 29b and the first inclined portion 29c of the cam 29. And thus, when the pivot arm 19 has been reversely rotated counterclockwise, the transmitting gear 20 can be smoothly engaged with the toothed portion 23a of the first partly-toothless gear 23. As the first partly-toothless gear 23 is slightly rotated counterclockwise to engage the cam follower pin 31 with the second curved portion 29g of the cam 29, the head attaching plate 9 is slightly returned in the direction of arrow B from the state of FIG. 4 by the energized force of the head return spring 12, thereby keeping stably in the reproducing operation position. As the head attaching plate 9 reaches reproducing operation position, the pinch roller 15 is pushed on the capstan 5 through the tape in the tape cassette (not shown) and the magnetic recording-/reproducing head 10 is contacted with the tape. Also, if the toothless portion 23b of the first partly-toothless gear 23 reaches the transmitting gear 20, this transmitting gear 20 departs from said gear 23 and the pivot arm 19 is rotated clockwise so that the one end 19a thereof is contacted with the one end 22a of the stopper member 22, thereby restricting the maximum clockwise-pivoting position thereof. Consequently, the transmitting gear 20 is engaged with the reel gear 3a of the take-up reel 3 and this take-up reel 3 is rotated clockwise, so that the tape is shifted at a low speed from the supply reel 4 to the take-up reel 3, thereby causing the reproducing operation [in the state of FIG. 5]. The maximum clockwise-pivoting position of the pivot arm 19 is arranged in such a position that the reel gear 3a of the take-up reel 3 provided with a slip mechanism (not shown) is engaged with the transmitting gear 20 a pitch circle to a pitch circle. And, when the head attaching plate 9 has been moved at the position of the reproducing operation, from a position detecting switch (not shown) for detecting the position of the head attaching plate 9 is outputted a signal representing that the head attaching plate 9 is in the position of the reproducing operation.

Next, the fast forward operation will be explained.

In the stop state as shown in FIGS. 1 and 2, if a switch for fast forward operation mode (not shown) is operated by the operation signal, the motor 2 is rotated clockwise, and the operations from the next operation till the transmitting gear 20 is engaged with the reel gear 3a of the take-up reel 3 are the same as the aforementioned reproducing operation. However, if the signal produced by the operation of the fast forward operation switch and the signal from the position detecting switch representing that the head attaching plate 9 is in the position of reproducing operation are detected, the inverting circuit (not shown) of the motor 2 is operated so that the motor 2 is rotated counterclockwise (in the reverse direction). By this rotation, the pivot arm 19 also is pivoted counterclockwise, the transmitting gear 20 rotating clockwise is engaged with the toothed portion 23a of the first partly-toothless gear 23 and the pivot arm 19 is intended to pivot counterclockwise. However, also at this time, since the center of the transmitting gear 20 is deviated backward in the pivoting direction [left in the drawing] from the line connecting between the center of the drive gear 18 and the center of first partly-toothless gear 23, the tooth top of the transmitting gear 20 is fitted with the tooth bottom of the toothed portion 23a of the first partly-toothless gear 23, thereby stopping the pivoting counterclockwise of the pivot arm 19 [in the state of FIG. 6]. In this state, the first partly-toothless gear 23 is rotated counterclockwise through the transmitting gear 20 driven by the drive gear 18. Since, by this rotation of the first partly-toothless gear 23, the one cam follower pin 31 is slidably contacted with the second arched portion 29b of the cam 29, the head attaching plate 9 is moved in the direction of arrow B by the energized force of the head return spring 12. When the one cam follower pin 31 is locked in a third curved recess 29h between the second arched portion 29b and the first arched portion 29a of the cam 29, the head attaching plate 9 is reached at the initial position, so that the pinch roller 15 is departed from the capstan 5 as well as the magnetic recording/reproducing head 10 is departed from the tape [in the state of FIG. 7]. As the head attaching plate 9 is returned to the stop position, a signal from the position detecting switch is not generated. Since, by this signal generating stop, the input of a inversion instruction signal to said motor inverting circuit is stopped, the motor 2 is again rotated clockwise and the pivot arm 19 also is rotated clockwise so that the transmitting gear 20 is engaged with the reel gear 3a of the take-up reel 3, thereby rotating take-up reel 3 clockwise. And thus, the tape is shifted at a high speed from the supply reel 4 side to the take-up reel 3 side, whereby the operation for the fast forward mode is performed [in the state of FIG. 8].

Next, a high speed erasing operation will be explained.

Figure 10:
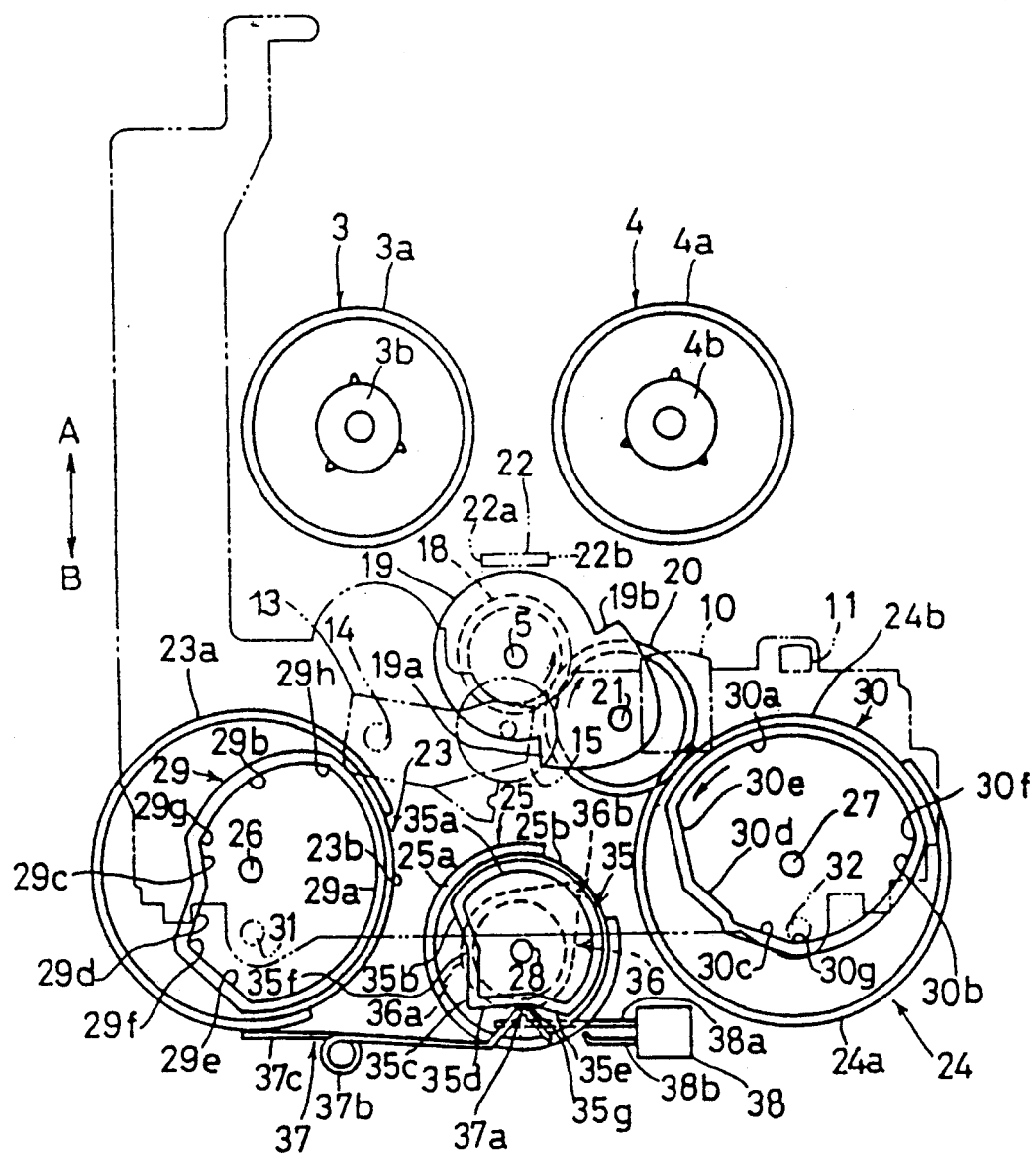
Figure 11:
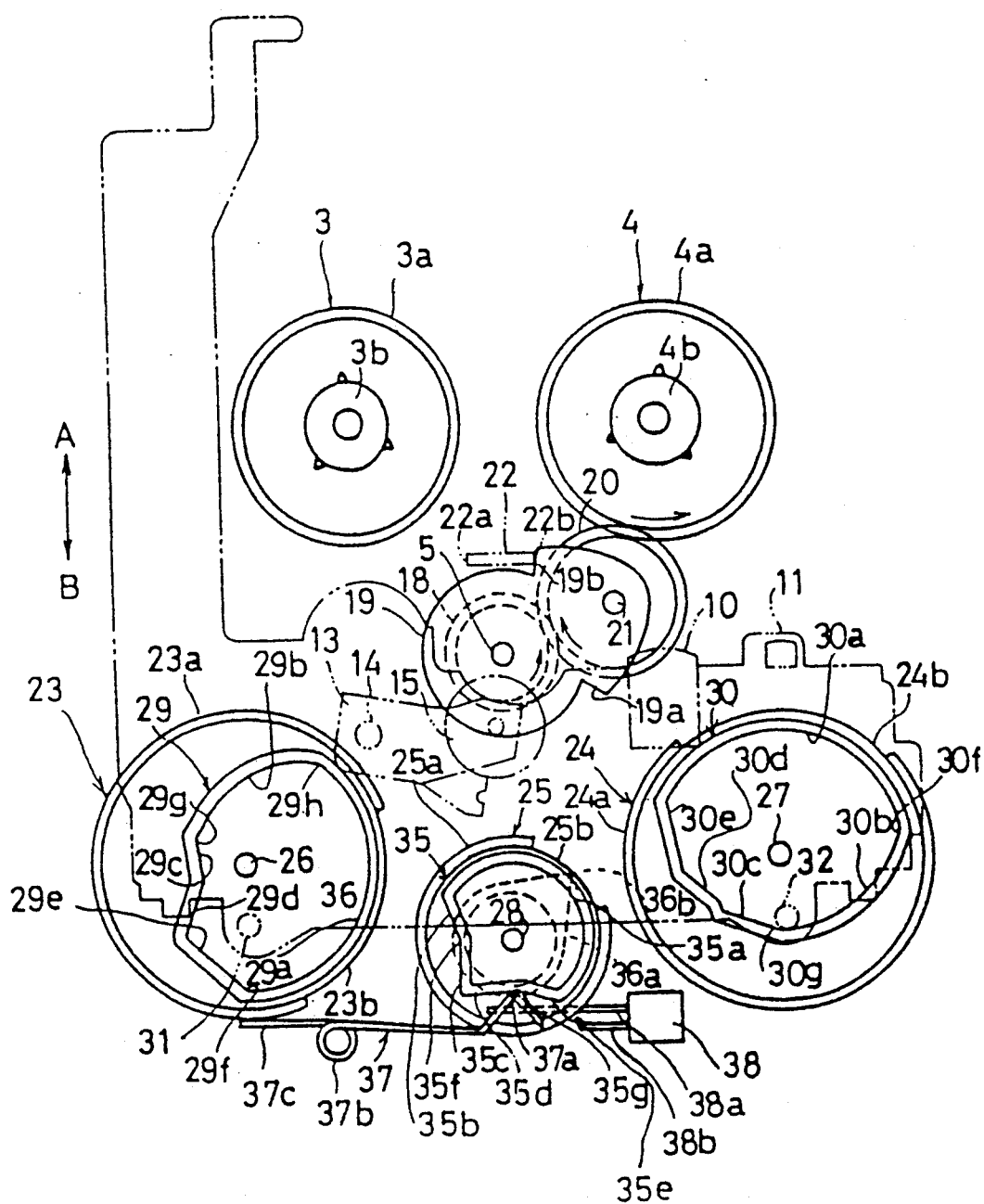
Figure 12:
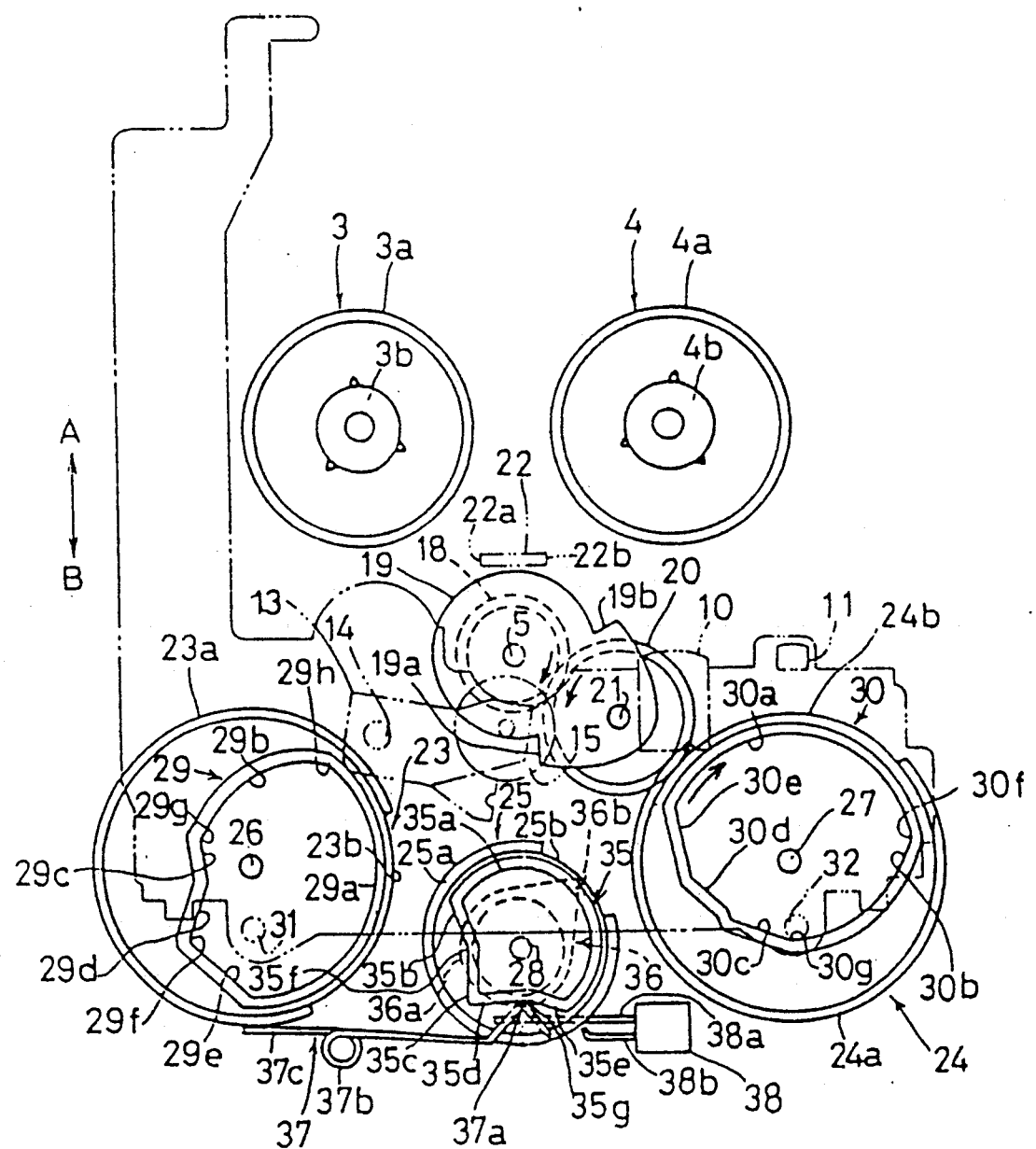
Figure 13:
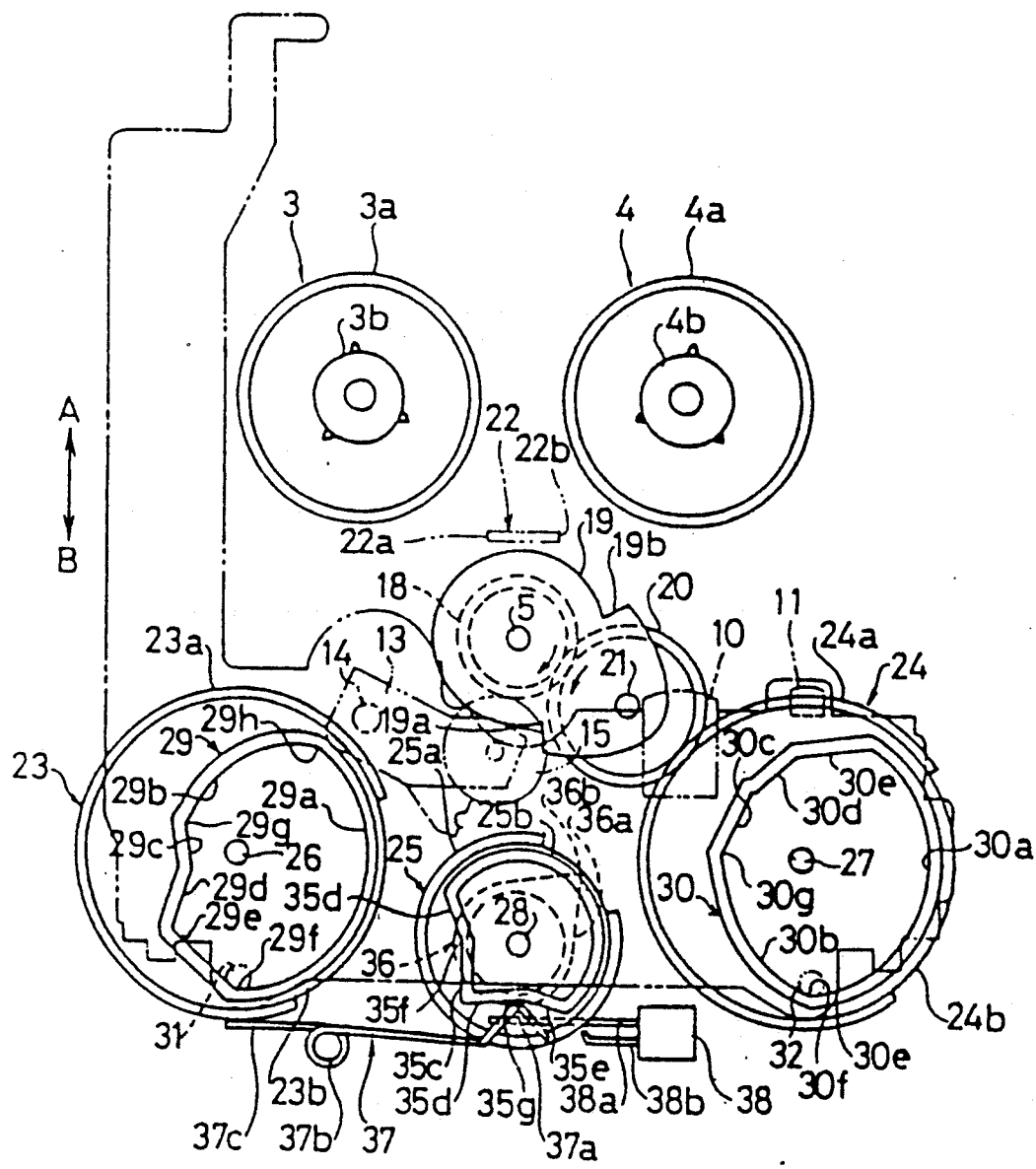
Figure 14:
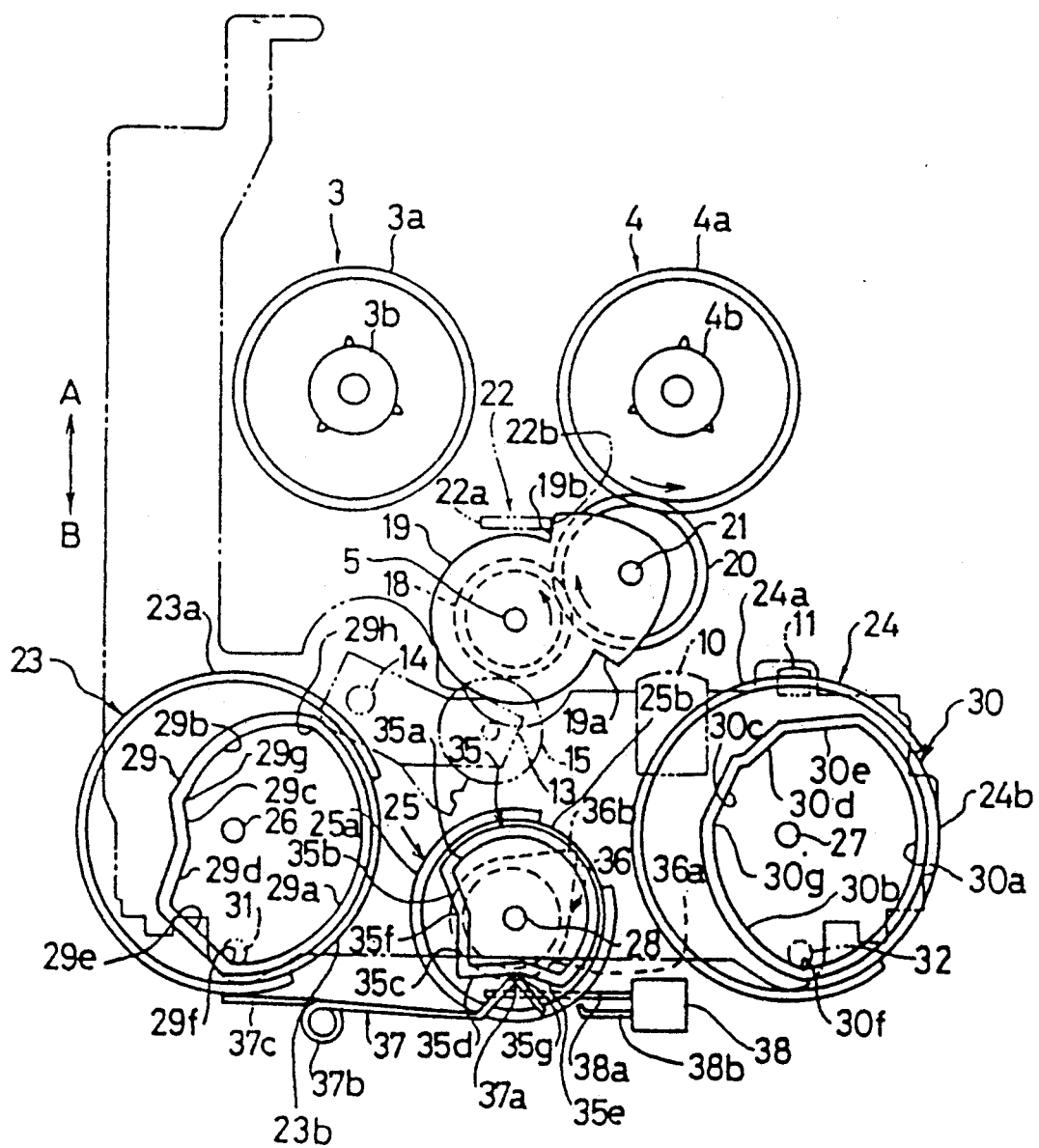

In the stop state of FIGS. 1 and 2, if a switch for high speed operation (not shown) is operated, the signal the motor inverting circuit is actuated so that the motor 2 is counterclockwise rotated at a constant speed. By the rotation of the motor 2, the flywheel 7, the drive gear 18 and the capstan 5 are integratedly rotated counterclockwise through the motor pulley 6 and the endless belt 8, and the transmitting gear 20 is rotated clockwise. Pivot arm 19 is intended to rotate counterclockwise about the capstan 5. At this time, since the transmitting gear 20 is departed from the third partly-toothless gear 25, the pivot arm 19 is rotated counterclockwise. The transmitting gear 20 departed from said third partly-toothless gear 25 is engaged with the toothed portion 24a of the second partly-toothless gear 24 and also the pivot arm 19 is intended to pivot counterclockwise. However, also at this time, since the center of the transmitting gear 20 is deviated backward in the pivoting direction [left in the drawing] from the line connecting between the center of the drive gear 18 and the center of second partly-toothless gear 24, the tooth top of the transmitting gear 20 is fitted with the tooth bottom of the toothed portion 24a of the second partly-toothless gear 24, thereby stopping the pivoting counterclockwise of the pivot arm 19 [in the state of FIG. 9]. In this state, the second partly-toothless gear 24 is counterclockwise rotated at a predetermined angle through the transmitting gear 20 driven by the drive gear 18. With this rotation of the second partly-toothless gear 24, the other cam follower pin 32, which has been locked by this time in the first curved recess 30f between the first arched portion 30a and the second inclined portion 30b of the cam 30, is slidably contacted with the second arched portion 30b and the first inclined portion 30c of the cam 30, so that the head attaching plate 9 is moved from the stop state to the direction of arrow A against the energized force of the head return spring 12 through the cam follower pin 32. At the termination of said movement, the toothless portion 24a of the second partly-toothless gear 24 is reached at the transmitting gear 20 and therewith the other cam follower pin 32 is slidably contacted with the first inclined portion 30c of the cam 30 which is integrated with the first partly-toothless gear 23 [in the state of FIG. 10]. Since the other cam follower pin 32, which is energized in the direction of arrow B through the head attaching plate 9 by the head return spring 12 at the termination of movement in the arrow A direction of the head attaching plate 9 in FIG. 10, is slidably contacted with the first inclined portion 30c of the cam 30 integrated with the second partly-toothless gear 24 said second partly toothless gear 24 is slightly reversely rotated clockwise, so that the cam follower pin 32 is stably stopped in the state engaged with a second curved recess 30g between the second arched portion 30b and the first inclined portion 30c of the cam 30. And thus, when the pivot arm 19 has been reversely rotated clockwise, the transmitting gear 20 can be smoothly engaged with the toothed portion 24a of the second partly-toothless gear 24. And, as the second partly-toothless gear 24 is slightly clockwise rotated reversely to engage the other cam follower pin 32 with the first curved portion 30f of the cam 30, the head attaching plate 9 is slightly returned in the direction of arrow B from the state of FIG. 10 by the energized force of the head return spring 12, thereby keeping stably in the erasing operation position. The moving amount of the head attaching from the stop position to the erasing position is slightly smaller than that from the stop position to the reproducing operation position. Consequently, when the head attaching plate 9 is in the position of the erasing operation, the pinch roller 15 is slightly departed from the capstan 5 and at this time the magnetic recording/reproducing head 10 is slightly departed from the tape. Also, the magnetic erasing head 11 is in the state which is contacted with the tape [in the state of FIG. 10]. Also, if the toothless portion 24b of the second partly-toothless gear 24 is reached at the transmitting gear 20, this transmitting gear 20 is departed from the second partly-toothless gear 24. Due to this, the pivot arm 19 is rotated counterclockwise so that the other end 19b thereof is contact with the other end 22b of the stopper member 22 and the maximum position capable of being counterclockwise pivoted is restricted. And thus, the transmitting gear 20 is engaged with the reel gear 4a of the supply reel 4 so that the supply reel 4 is rotated counterclockwise. Accordingly, the erasing operation is performed by the tape being run at a high speed from the take-up reel 4 side to the supply reel 4 side [in the state of FIG. 11].

Now, the rewinding operation mode is described.

In the stop state as shown in FIGS. 1 and 2, if a switch for rewinding operation mode (not shown) is operated, the motor 2 is rotated counterclockwise, and the operations from the next operation till the transmitting gear 20 is engaged with the reel gear 41 of the supply reel 4 are the same as the aforementioned fast forward operation. However, the signal produced by the operation of the rewinding operation switch and the signal from the position detecting switch representing that the head attaching plate 9 is in the position of the high speed erasing operation are detected, cause the inverting instruction signal not to be inputted to the inverting circuit of the motor 2 so that the motor 2 is rotated clockwise. By this rotation, the pivot arm 19 also is pivoted clockwise, the transmitting gear 20 is engaged with the toothed portion 24a of the second partly-toothless gear 24 and the pivot arm 19 is intended to pivot clockwise. However, at this time, since the center of the transmitting gear 20 is deviated backward in the pivoting direction [right in the drawing] from the line connecting between the center of the drive gear 18 and the center of second partly-toothless gear 24, the tooth top of the transmitting gear 20 is fitted with the tooth bottom of the toothed portion 24a of the second partly-toothless gear 24, thereby stopping the pivoting clockwise of the pivot arm 19 [in the state of FIG. 12]. In this state, the second partly-toothless gear 24 is rotated clockwise through the transmitting gear 20 driven by the drive gear 18. Since, by this rotation of the second partly-toothless gear 24, the other cam follower pin 32 is slidably contacted with the second arched portion 30b of the cam 30, the head attaching plate 9 is moved in the direction of arrow B by the energized force of the head return spring 12. And, when the other cam follower pin 32 is locked in a first curved recess 30f between the second arched portion 30b and the first arched portion 30a of the cam 30, the head attaching plate 9 is reached at the initial position, so that the pinch roller 15 is departed from the capstan 5 as well as the magnetic recording/reproducing head 10 and the magnetic erasing head 11 are departed from the tape [in the state of FIG. 13]. As the head attaching plate 9 is returned to the stop position, said motor inverting circuit is operated by the signal output from the position detecting switch so that the motor 2 is rotated counterclockwise. With this rotation, the pivot arm 19 also is rotated counterclockwise and the transmitting gear 20 rotating clockwise is engaged with the reel gear 4a of the supply reel 4, thereby causing the supply reel 4 to rotate counterclockwise. And thus, the tape is shifted at a high speed from the take-up reel 3 side to the supply reel 4 side, whereby the rewinding operation is performed [in the state of FIG. 14].

Lastly, a mode switching operation from the reproducing operation state to the stop state will be described.

Figure 5:
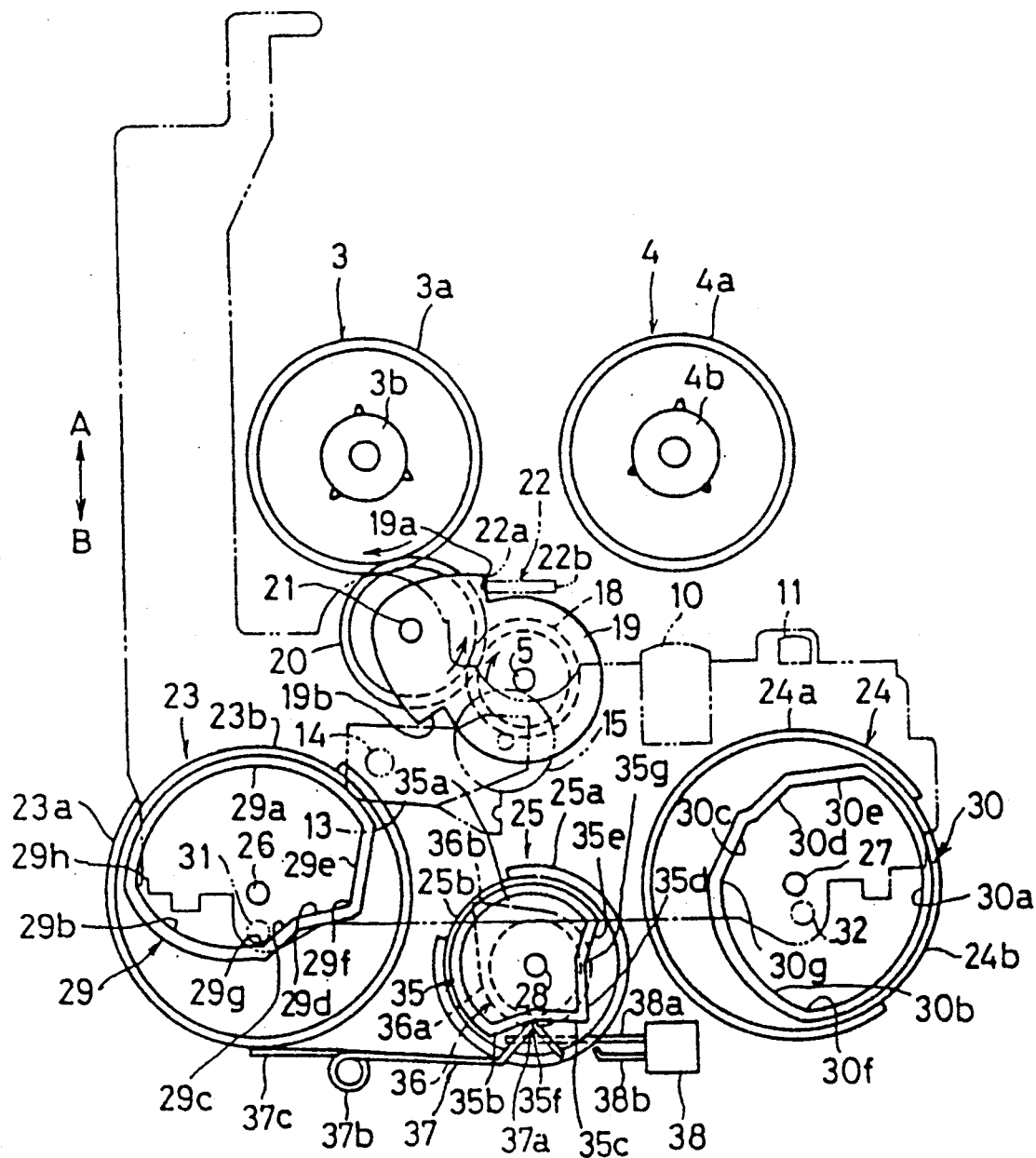
Figure 6:
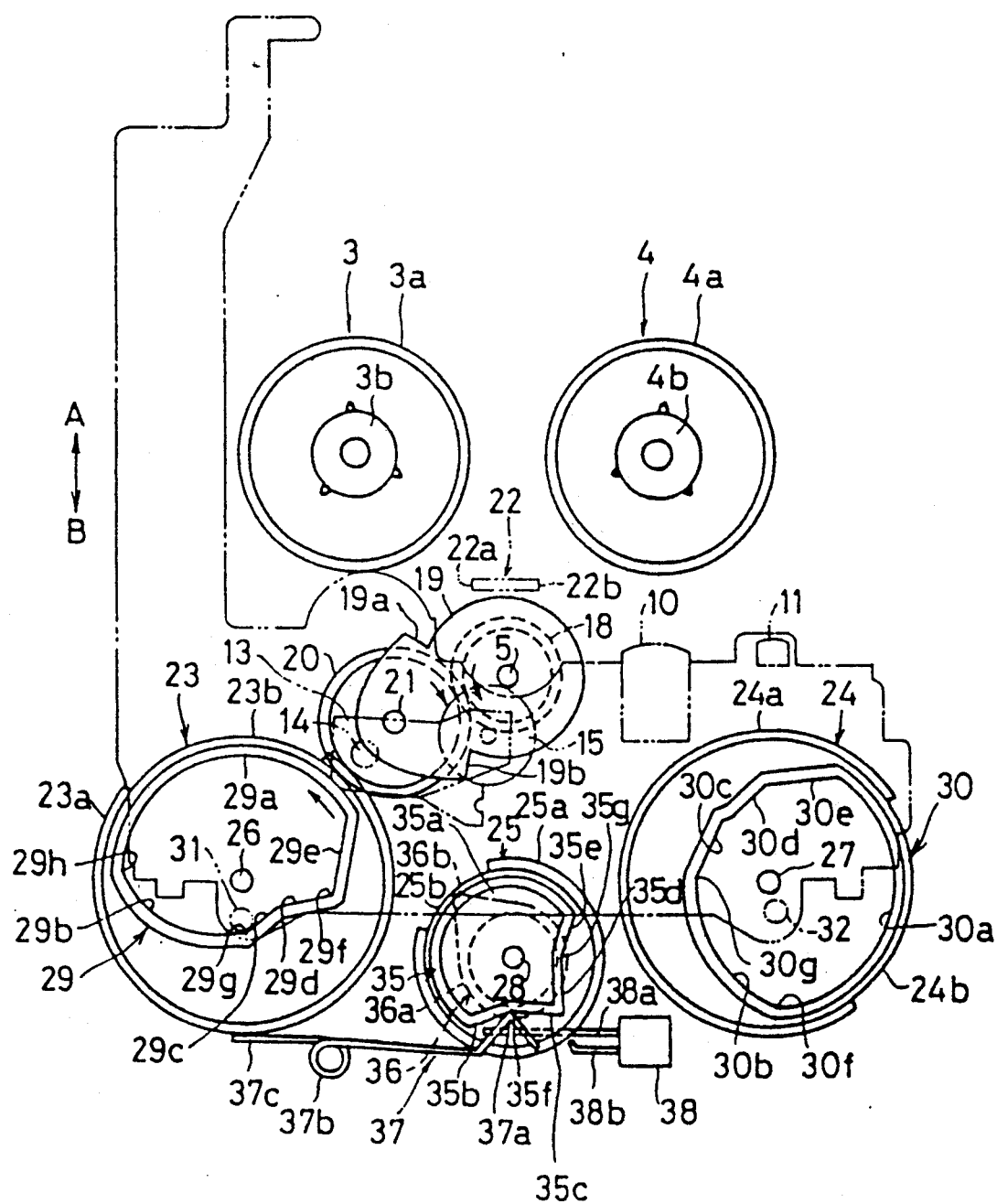
Figure 7:
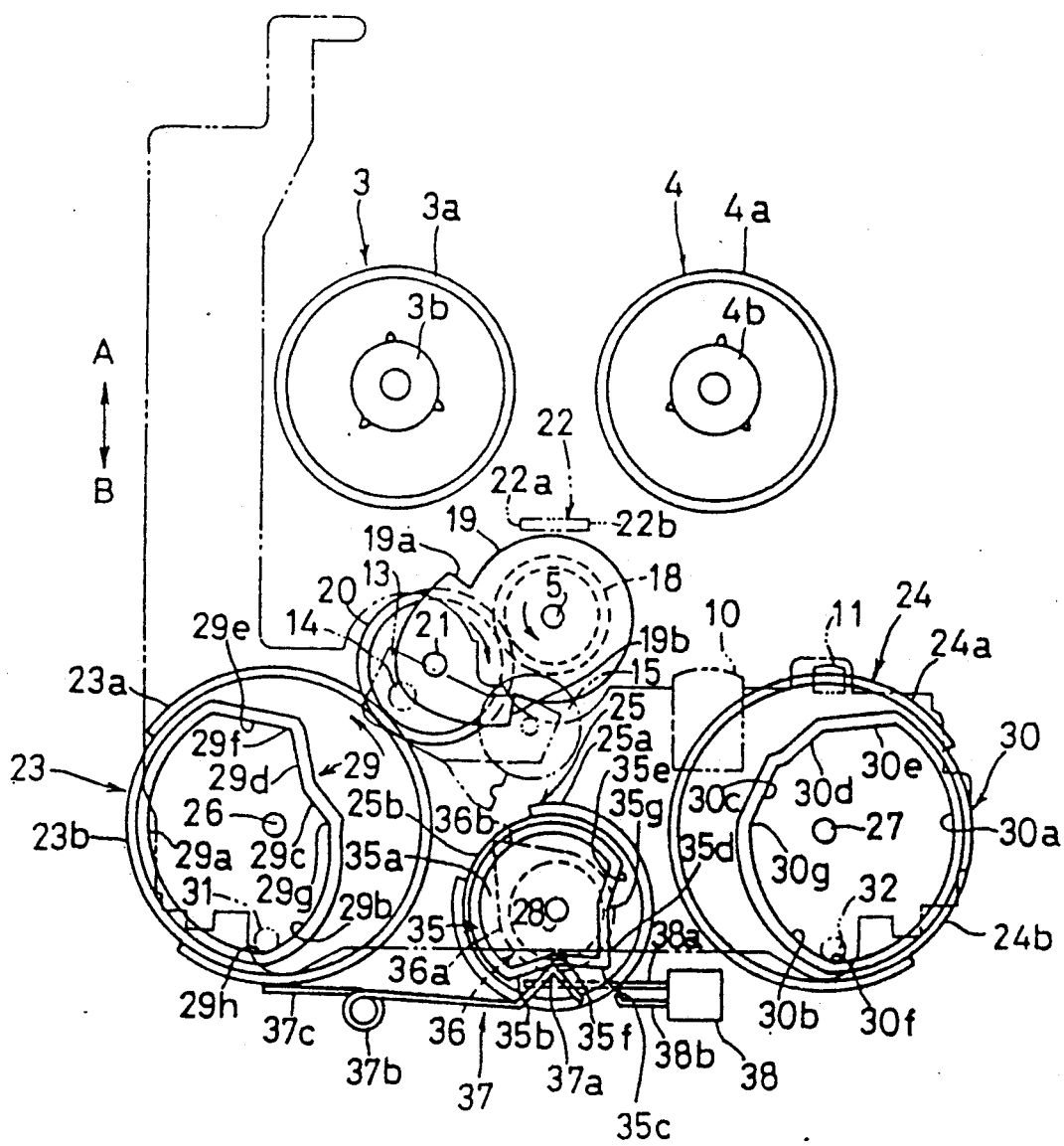
Figure 8:
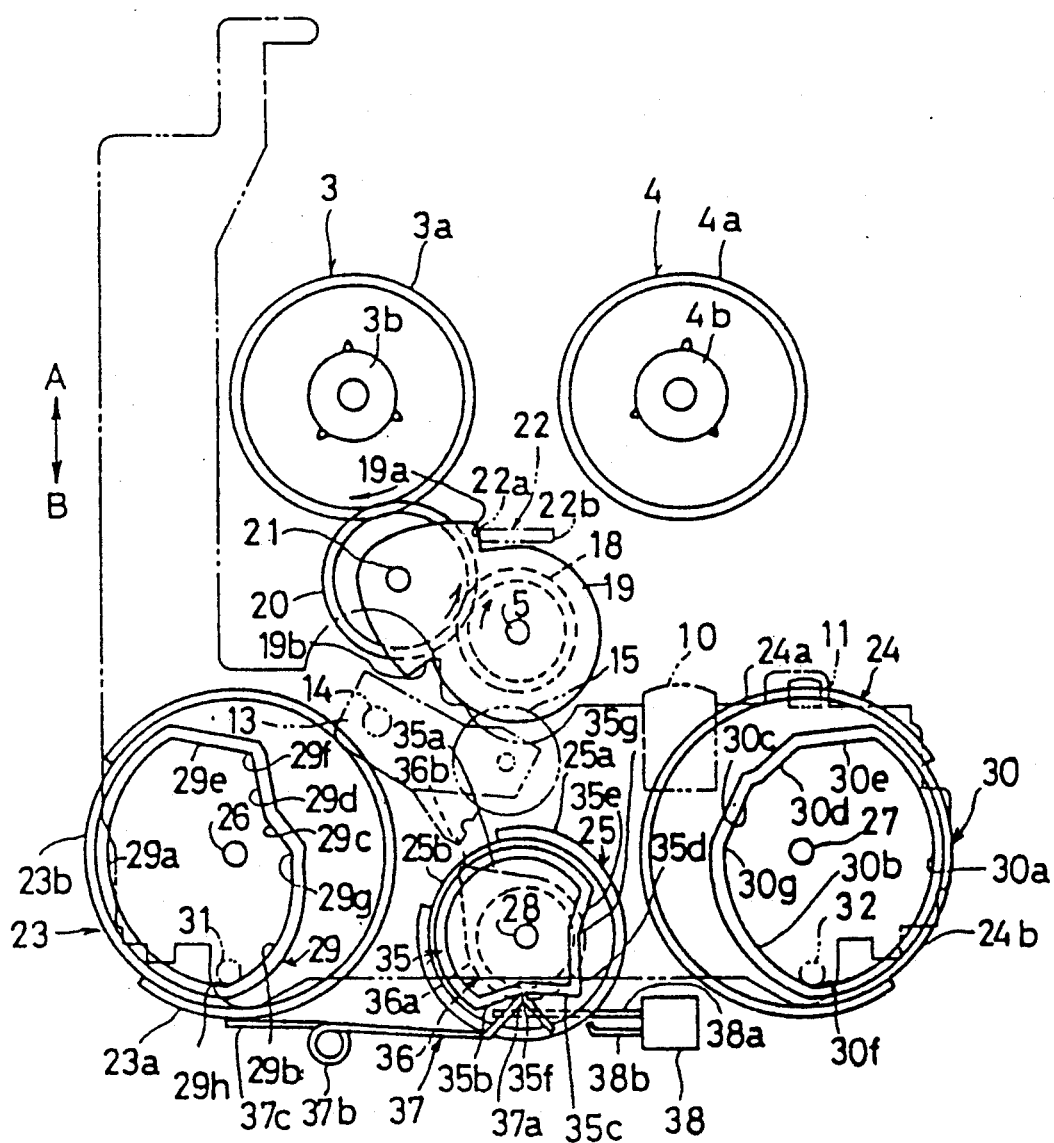
Figure 9:
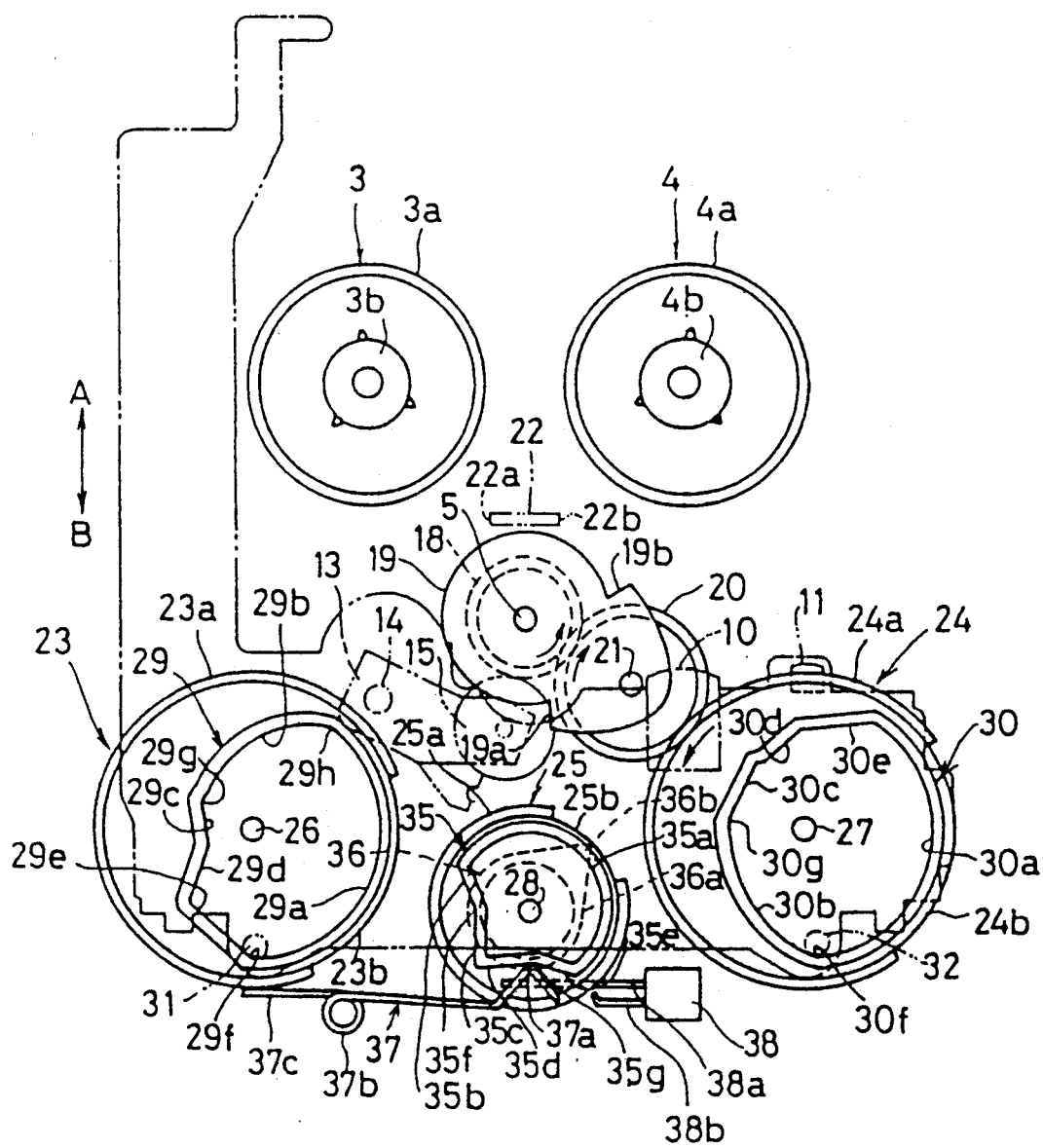
Figure 15:
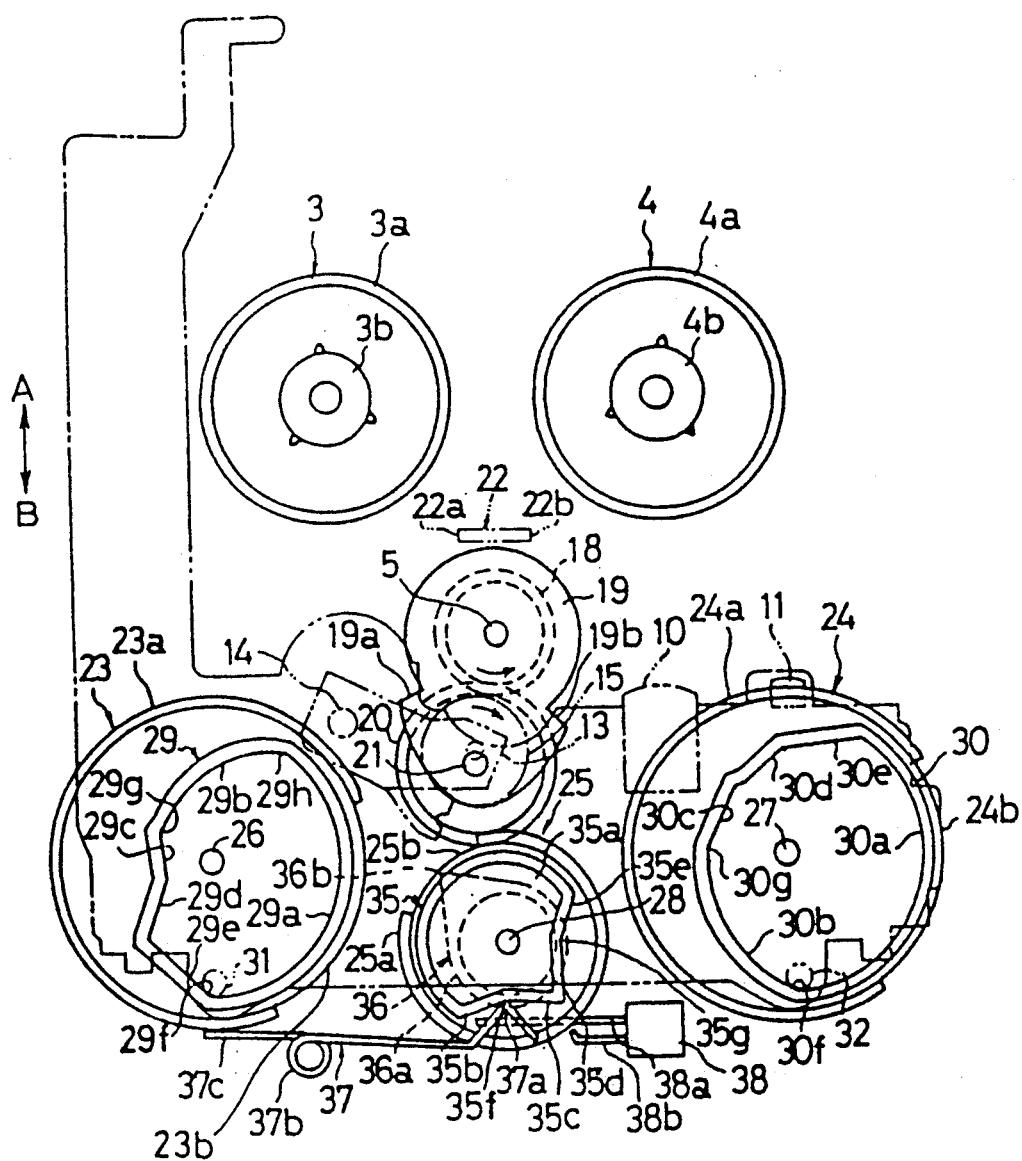

In the reproducing operation mode as shown in FIG. 5, if the switch for stop operation (not shown) is operated, the motor inverting circuit is actuated so that the motor 2 is rotated counterclockwise. With this rotation of the motor 2, the pivot arm 19 is pivoted counterclockwise, so that the transmitting gear 20 is engaged with the toothed 23a of the first partly-toothless gear 23. And then, this first partly-toothless gear 23 is rotated counterclockwise. After the operations of the states represented in FIGS. 6 and 7 have been performed, the transmitting gear 20 is engaged with the toothed 25a of the third partly-toothless gear 25 as shown in FIG. 15. Consequently, the third partly-toothless gear 25 is rotated counterclockwise so that the protruded portion 36b of the second cam gear 36 presses down the movable contact segment 39a of the motor stopping switch 38, thereby causing it to contact the movable contact segment 38a with the fixed contact segment 38b. Therefore, the motor stopping switch 38 is turned on. As described above, since the stop operation switch has already been operated, both the operation signal from the stop operation switch and the ON signal from the motor stopping switch 38 are established. Accordingly, the supply voltage to the motor 2 is interrupted, so that the motor 2 is stopped and the tape recorder is in the stop state shown in FIG. 2.

Figure 17:
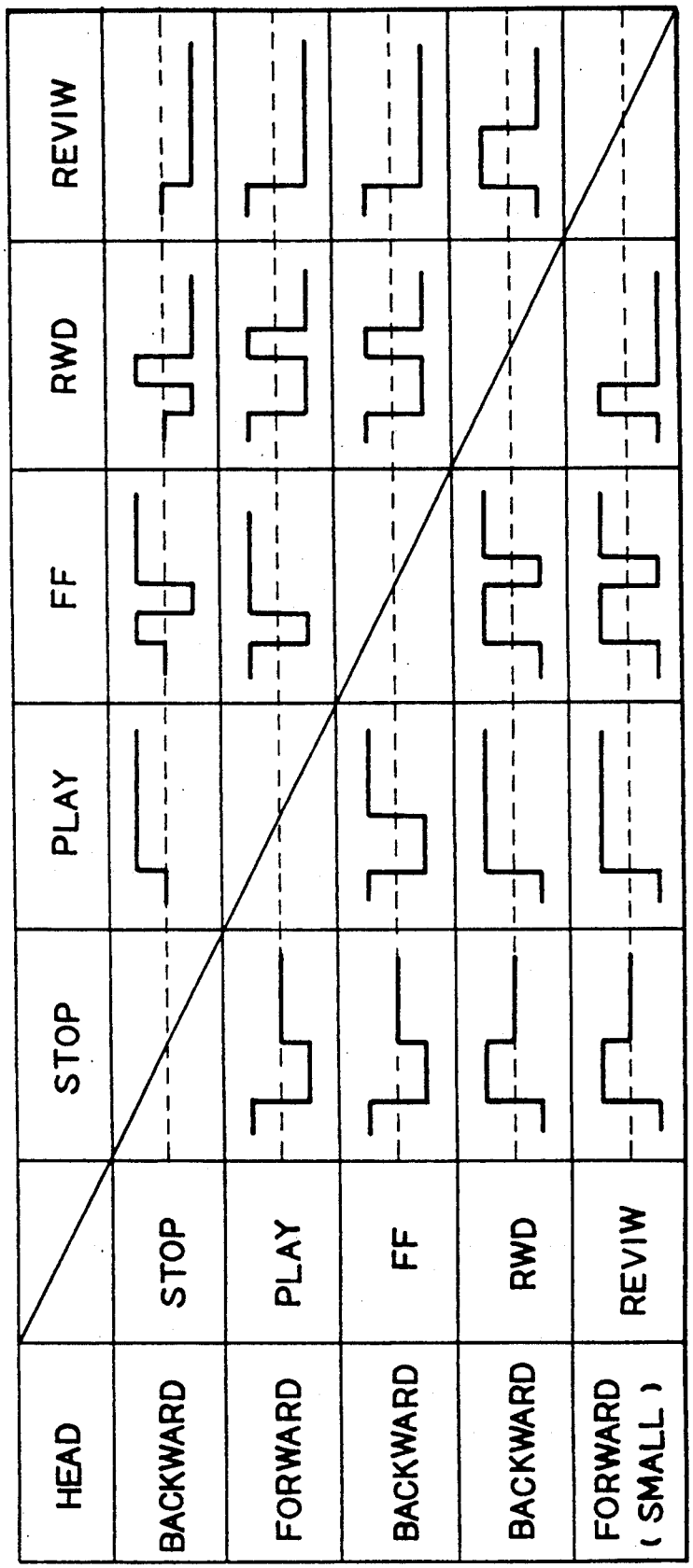
FIG. 17 illustrates the relationship between the reversing timing of the rotation direction of a motor and the position of a magnetic recording and reproducing head in each operating state of said sequence control mechanism.

FIG. 17 represents the relationship to the positions of the magnetic recording/reproducing head in each of the operating states and the reversing timing of the rotation direction of the motor 2 in each of the operation switching states, in which the broken lines represent that the motor 2 is stopped, the solid lines above the broken lines represent that the motor 2 is rotated forward (clockwise on the drawing), and the solid lines below the broken lines represent that the motor 2 is rotated reversely (counterclockwise in the drawing), respectively.

While this invention has been described in its preferred embodiment with respect to an application to a tape recorder, it is to be understood that the invention is not limited thereto, but is capable of having application to various uses, for example, a motor drive unit for actuating a automatic film winding and a shutter set of a camera, a actuating mechanism which in a video tape recorder presses contactably a tape to a capstan after a tape loading has been completed, or a actuating mechanism which controls a plurality of electromagnets to actuate sequently a plurality of actuating portions, etc.

As described above, a sequence control mechanism employing gear mechanism according to the present invention comprises a drive gear driven by a motor, a pivot arm mounted on a same shaft as that of said drive gear, a transmitting gear which is supported by a shaft mounted on said pivot arm and is cooperated with said drive gear, partly-toothless gears which are provided with toothed portions stopping on tooth bottoms thereof the idling operation of said transmitting gear and engaging with said transmitting gear and toothless portion permitting the idling operation, a first actuating mechanism which cooperates to engage with said partly-toothless gears as well as which gives to said partly-toothless gears the return force for positioning said toothed portions thereof on the idling track of said transmitting gear, and a second actuating mechanism which, when said transmitting gear passed by said toothless portions of said partly-toothless gears, engages with said transmitting gear so that it is driven by said drive gear.

Accordingly, the present invention can perform the sequence control of a plurality of actuating portions by simple construction which controls the timing driving and stopping the motor and the switching of the rotating direction without the clutch mechanisms or the electromagnet.

What is claimed is:

1. A sequence control mechanism for use in a tape recorder and the like, which comprises:
   (a) a drive gear mounted on a drive shaft which is rotatable by a motor;
   (b) a pivot arm mounted on the drive shaft;
   (c) a transmitting gear mounted on a second shaft, the transmitting gear being in cooperation with the drive gear;
   (d) partly-toothless gears mounted so either (i) the toothed portions of the gears selectively engage the transmitting gear to stop it from rotating or (ii) the toothless portions of the gears disengage the transmitting gear to allow the transmitting gear to rotate;
   (e) a first actuating mechanism engaging the partly-toothless gears to selectively position them in either (i) a position which allows the transmitting gear to rotate or (ii) a position which stops the transmitting gear rotating; and
   (f) a second actuating mechanism engaging the transmitting gear with the drive gear when the transmitting gear is disengaged from the partly-toothless gears.

2. A sequence control mechanism of claim 1, wherein a cam is mounted on one of the partly-toothless gears and a cam follower pin is mounted on another partly-toothless gear.

3. A sequence control mechanism of claim 1, wherein the drive gear is rotated by a motor capable of rotating both forwardly and reversely.

* * * * *